US011842502B2

(12) United States Patent
Ishiwatari et al.

(10) Patent No.: US 11,842,502 B2
(45) Date of Patent: Dec. 12, 2023

(54) DATA SYNCHRONIZATION DEVICE, DATA SYNCHRONIZATION METHOD, AND COMPUTER READABLE MEDIUM

(71) Applicant: Mitsubishi Electric Corporation, Tokyo (JP)

(72) Inventors: Yosuke Ishiwatari, Tokyo (JP); Masahiko Tanimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 646 days.

(21) Appl. No.: 17/091,220

(22) Filed: Nov. 6, 2020

(65) Prior Publication Data

US 2021/0056714 A1 Feb. 25, 2021

Related U.S. Application Data

(63) Continuation of application No. PCT/JP2018/018376, filed on May 11, 2018.

(51) Int. Cl.
*G06T 7/285* (2017.01)
*G06T 7/70* (2017.01)
(Continued)

(52) U.S. Cl.
CPC .......... *G06T 7/285* (2017.01); *B60W 40/107* (2013.01); *G06N 20/00* (2019.01); *G06T 7/70* (2017.01);
(Continued)

(58) Field of Classification Search
CPC ...... H04W 4/027; H04W 4/38; G01C 21/206; G01C 21/34; G04W 4/027; H04N 23/60
See application file for complete search history.

(56) References Cited

U.S. PATENT DOCUMENTS 7,505,865 B2 * 3/2009 Ohkubo .................... G01P 3/62 702/158
7,747,383 B2 * 6/2010 Ohkubo .................... G01P 7/00 701/79
(Continued)

FOREIGN PATENT DOCUMENTS

JP 2000-222580 A 8/2000
JP 2007-264884 A 10/2007
(Continued)

OTHER PUBLICATIONS

German Office Action for German Application No. 112018007442.0, dated Apr. 13, 2021, with English translation.
(Continued)

*Primary Examiner* — Yosef Kassa
(74) *Attorney, Agent, or Firm* — Birch, Stewart, Kolasch & Birch, LLP

(57) ABSTRACT

In a data synchronization device (20), a first estimation unit (51) estimates as a first data range, a data range in which a vehicle is turning right or left, in moving image data (33). A second estimation unit (52) estimates as a second data range, a data range in which the vehicle is turning right or left, in acceleration data (34). A synchronization unit (53) performs a time-synchronization between the moving image data (33) and the acceleration data (34) based on a time range corresponding to the first data range estimated by the first estimation unit (51) and a time range corresponding to the second data range estimated by the second estimation unit (52).

13 Claims, 7 Drawing Sheets

(51) Int. Cl.
*G06N 20/00* (2019.01)
*B60W 40/107* (2012.01)

(52) U.S. Cl.
CPC ... *B60W 2420/42* (2013.01); *B60W 2520/105* (2013.01); *G06T 2207/30252* (2013.01)

(56) References Cited

U.S. PATENT DOCUMENTS

| | | | | |
|---|---|---|---|---|
| 8,195,392 | B2 * | 6/2012 | Watanabe | G01C 21/26 701/472 |
| 8,892,331 | B2 * | 11/2014 | Kumabe | B60W 40/04 356/152.1 |
| 9,196,161 | B2 * | 11/2015 | Lai | G08G 1/146 |
| 9,661,466 | B1 * | 5/2017 | Andersson | H04W 4/027 |
| 2011/0187861 | A1 | 8/2011 | Totani | |
| 2014/0002664 | A1 | 1/2014 | Hanabusa | |
| 2014/0267904 | A1 | 9/2014 | Saboune et al. | |
| 2015/0262376 | A1 | 9/2015 | Saboune et al. | |
| 2018/0144480 | A1 | 5/2018 | Saboune et al. | |

FOREIGN PATENT DOCUMENTS

| | | | |
|---|---|---|---|
| JP | 2011-159093 | A | 8/2011 |
| JP | 2013-93738 | A | 5/2013 |
| JP | 2014-11633 | A | 1/2014 |
| JP | 2014-194765 | A | 10/2014 |

OTHER PUBLICATIONS

International Search Report for PCT/JP2018/018376, dated Aug. 14, 2018.

* cited by examiner

20
DATA SYNCHRONIZATION DEVICE
21
PROCESSOR
51
FIRST ESTIMATION UNIT
61
MOVEMENT VECTOR CALCULATION UNIT
62
DOMINANT DIRECTION DECISION UNIT
63
ACTION FRAME DECISION UNIT
53
SYNCHRONIZATION UNIT
64
GAP AMOUNT CALCULATION UNIT
65
GAP ADJUSTMENT UNIT
52
SECOND ESTIMATION UNIT
22
MEMORY
33
MOVING IMAGE DATA
34
ACCELERATION DATA
ADJUSTED MOVING IMAGE DATA
ADJUSTED ACCELERATION DATA

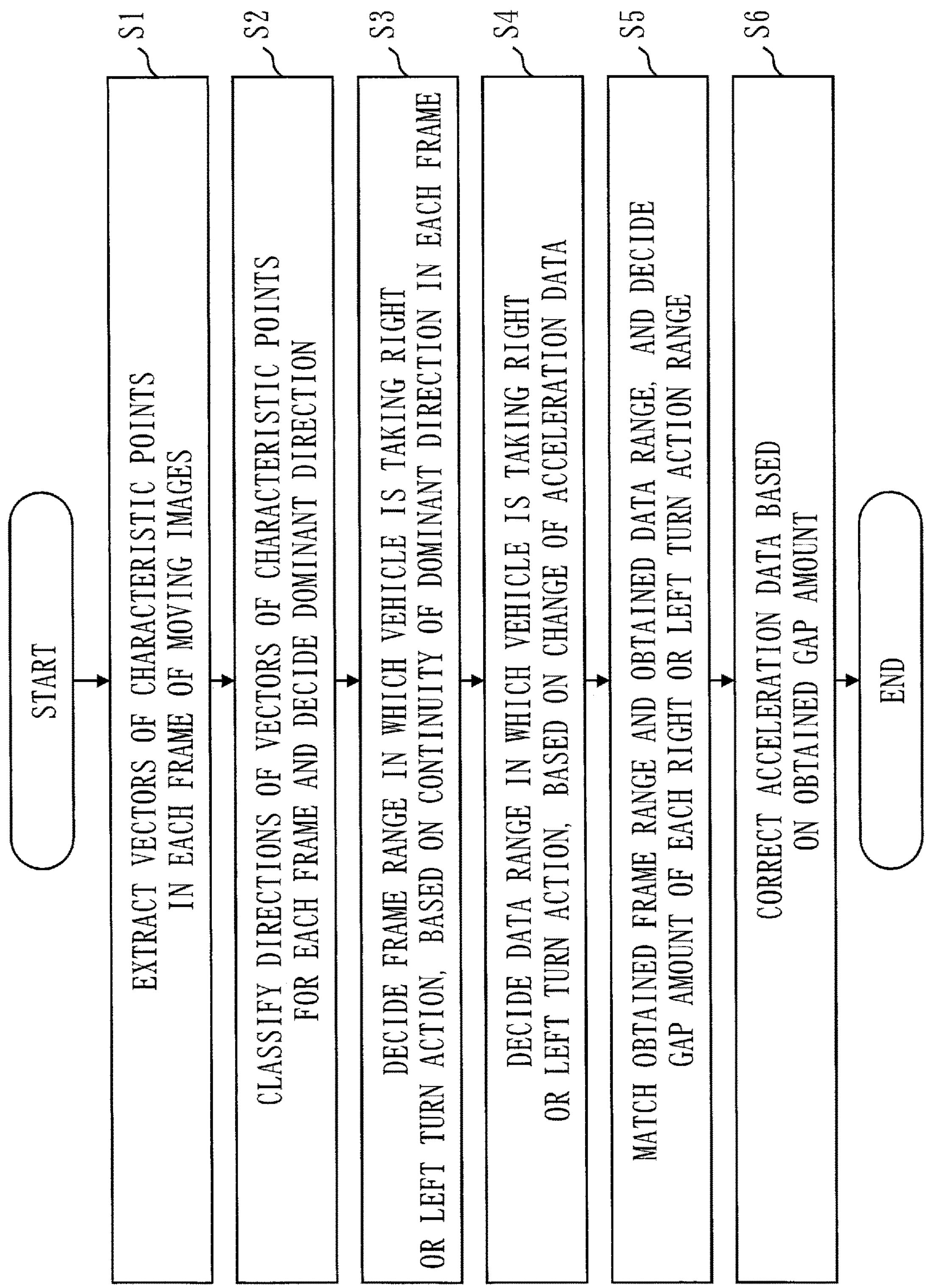
Fig. 3
START
S1
EXTRACT VECTORS OF CHARACTERISTIC POINTS IN EACH FRAME OF MOVING IMAGES
S2
CLASSIFY DIRECTIONS OF VECTORS OF CHARACTERISTIC POINTS FOR EACH FRAME AND DECIDE DOMINANT DIRECTION
S3
DECIDE FRAME RANGE IN WHICH VEHICLE IS TAKING RIGHT OR LEFT TURN ACTION, BASED ON CONTINUITY OF DOMINANT DIRECTION IN EACH FRAME
S4
DECIDE DATA RANGE IN WHICH VEHICLE IS TAKING RIGHT OR LEFT TURN ACTION, BASED ON CHANGE OF ACCELERATION DATA
S5
MATCH OBTAINED FRAME RANGE AND OBTAINED DATA RANGE, AND DECIDE GAP AMOUNT OF EACH RIGHT OR LEFT TURN ACTION RANGE
S6
CORRECT ACCELERATION DATA BASED ON OBTAINED GAP AMOUNT
END 20
DATA SYNCHRONIZATION DEVICE
23
PROCESSOR
51
FIRST ESTIMATION UNIT
33
MOVING IMAGE DATA
61
MOVEMENT VECTOR CALCULATION UNIT
62
DOMINANT DIRECTION DECISION UNIT
63
ACTION FRAME DECISION UNIT
53
SYNCHRONIZATION UNIT
34
ACCELERATION DATA
52
SECOND ESTIMATION UNIT
64
GAP AMOUNT CALCULATION UNIT
65
GAP ADJUSTMENT UNIT
ADJUSTED MOVING IMAGE DATA
ADJUSTED ACCELERATION DATA

DATA SYNCHRONIZATION DEVICE, DATA SYNCHRONIZATION METHOD, AND COMPUTER READABLE MEDIUM

CROSS REFERENCE TO RELATED APPLICATION

This application is a Continuation of PCT International Application No. PCT/JP2018/018376, filed on May 11, 2018, which is hereby expressly incorporated by reference into the present application.

TECHNICAL FIELD

The present invention relates to a data synchronization device, a data synchronization method, and a data synchronization program.

BACKGROUND ART

In recent years, as in autonomous driving, researches have been widely carried out as to installing a large number of sensors and analyzing data obtained therefrom. In the autonomous driving, a vehicle recognizes an obstacle in the vicinity of the vehicle by using various sensors installed and travels while avoiding the obstacle.

At a time of recognizing the obstacle in the vicinity of the vehicle, it is important that each piece of data obtained from each sensor has been time-synchronized. If a time-synchronization has not been performed, an obtained result and a relationship with an actual obstacle in the vicinity do not match, which hinders a data analysis.

If sensor data is not used in real-time but the sensor data is recorded and the sensor data is used in off-line later, there is a problem in use of data that has not been time-synchronized. This is because the data cannot be consistent with an event that has actually occurred, while the event is like how obstacles in the vicinity are arranged.

Generally, a synchronization is performed by attaching sensors to a same system and giving a same time to it. When pieces of data acquired separately by a plurality of systems are used, a synchronization between the systems is necessary.

Even if the synchronization between the systems is performed, a gap may occur during system operation, and thus a periodic synchronization process is necessary.

As an example of data acquisition by the plurality of systems, there is a situation in which while data of a sensor attached to a vehicle in advance is being acquired via a CAN, a camera image is being acquired by a drive recorder which is separately installed on the vehicle and is not connected to the CAN. "CAN" is an abbreviation for Car Area Network. Recent vehicles are also equipped with a connector capable of retrieving a piece of sensor data among pieces of sensor data from the CAN, so that a driver can retrieve the data.

In Patent Literature 1 and Patent Literature 2, a method for performing a synchronization at a time of recording sensor data is described.

In Patent Literature 3, a method is described, in which based on a result of a comparison between a relative speed of a vehicle and a relative speed of another vehicle, a time delay amount of data of the relative speed received from the other vehicle is calculated, and based on this time delay amount, extracted data of state quantity of the other vehicle is corrected.

CITATION LIST

Patent Literature

Patent Literature 1: JP2011-159093A
Patent Literature 2: JP2014-011633A
Patent Literature 3: JP2007-264884A

SUMMARY OF INVENTION

Technical Problem

The methods described in Patent Literature 1 and Patent Literature 2 cannot be applied if the sensor data is recorded and the sensor data is used in off-line later.

In order to synchronize pieces of sensor data which have not been synchronized, obtained by a plurality of systems, it is necessary to detect a synchronization point in some way. In the method described in Patent Literature 3, pieces of data having a same meaning such as a relative speed are acquired by the plurality of systems, and the synchronization is performed by matching the pieces of data.

For a synchronization between a plurality of systems that have not acquired a same data, it is necessary to detect the synchronization point in a way different from simply matching the pieces of data.

The present invention aims to perform a time-synchronization between different types of pieces of data.

Solution to Problem

A data synchronization device according to one aspect of the present invention includes:

- a first estimation unit to estimate as a first data range, a data range in which a vehicle is in a certain motion, in time-series data of images obtained by shooting outside of the vehicle with a camera installed on the vehicle;
- a second estimation unit to estimate as a second data range, a data range in which the vehicle is in the motion, in time-series data of acceleration obtained by an acceleration sensor installed on the vehicle; and
- a synchronization unit to perform a time-synchronization between the time-series data of the images and the time-series data of the acceleration based on a time range corresponding to the first data range estimated by the first estimation unit and a time range corresponding to the second data range estimated by the second estimation unit.

Advantageous Effects of Invention

In the present invention, a time range corresponding to a data range in which a vehicle is in a certain "motion", in time-series data of images obtained by a camera, and a time range corresponding to a data range in which the vehicle is in the "motion", in time-series data of acceleration obtained by an acceleration sensor are referred to. Therefore, according to the present invention, it is possible to perform a time-synchronization between different types of pieces of data which are time-series data of images and time-series data of acceleration.

BRIEF DESCRIPTION OF DRAWINGS

FIG. 3 is a flowchart illustrating operation of the data synchronization device according to the first embodiment;

DESCRIPTION OF EMBODIMENTS

Figure 1:
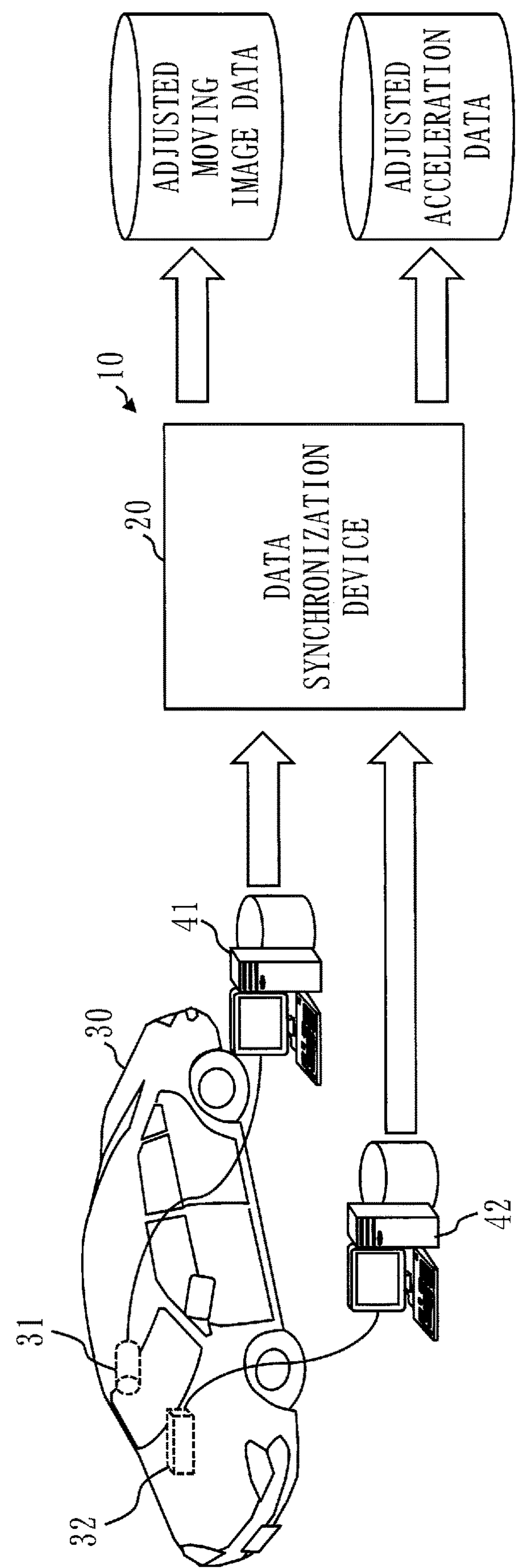
FIG. 1 is a diagram illustrating a configuration of a data synchronization system according to a first embodiment.

Hereinafter, embodiments of the present invention will be described with reference to the drawings. In each drawing, the same reference numerals are assigned to the same or corresponding parts. In description of the embodiments, descriptions of the same or corresponding parts will be appropriately omitted or simplified. Besides, the present invention is not limited to the embodiments described below, and various modifications can be made as necessary. For example, two or more embodiments among the embodiments described below may be combined and implemented. Alternatively, one embodiment or a combination of two or more embodiments among the embodiments described below may be partially implemented.

First Embodiment

The present embodiment will be described with reference to FIGS. 1 to 5.

*Description of Configuration*

A configuration of a data synchronization system 10 according to the present embodiment will be described with reference to FIG. 1.

The data synchronization system 10 includes a data synchronization device 20, a camera 31 installed on a vehicle 30, an acceleration sensor 32 installed on the vehicle 30, a moving image recording-purpose system 41 that records a moving image taken by the camera 31, and an acceleration recording-purpose system 42 that records an acceleration value acquired by the acceleration sensor 32.

The moving image recording-purpose system 41 and the acceleration recording-purpose system 42 are computers. The moving image recording-purpose system 41 and the acceleration recording-purpose system 42 are, for example, PCs. "PC" is an abbreviation for Personal Computer.

As described above, for a synchronization between a plurality of systems that have not acquired a same data, it is necessary to detect a synchronization point in a way different from simply matching pieces of data. If it is possible to determine using sensor data that the vehicle 30 is taking some action such as a right or left turn, it is possible to perform a synchronization based on the action, assuming that ranges of pieces of sensor data indicating the same action being taken indicate a same time period.

It is also possible from certain sensor data to conjecture a value of completely different sensor data and perform the synchronization based on the result. In the present embodiment, acceleration of the vehicle 30 is estimated based on images of the camera 31 and is compared with the acceleration value obtained by the acceleration sensor 32. In this way, even when pieces of sensor data are recorded and used in off-line later, synchronization points can be obtained from the pieces of sensor data, so that the synchronization at a time of recording is unnecessary. As a result, the synchronization can be performed even for pieces of data that have failed to be synchronized at the time of recording due to a mistake. Thus, usefulness of the pieces of data is improved.

Figure 2:
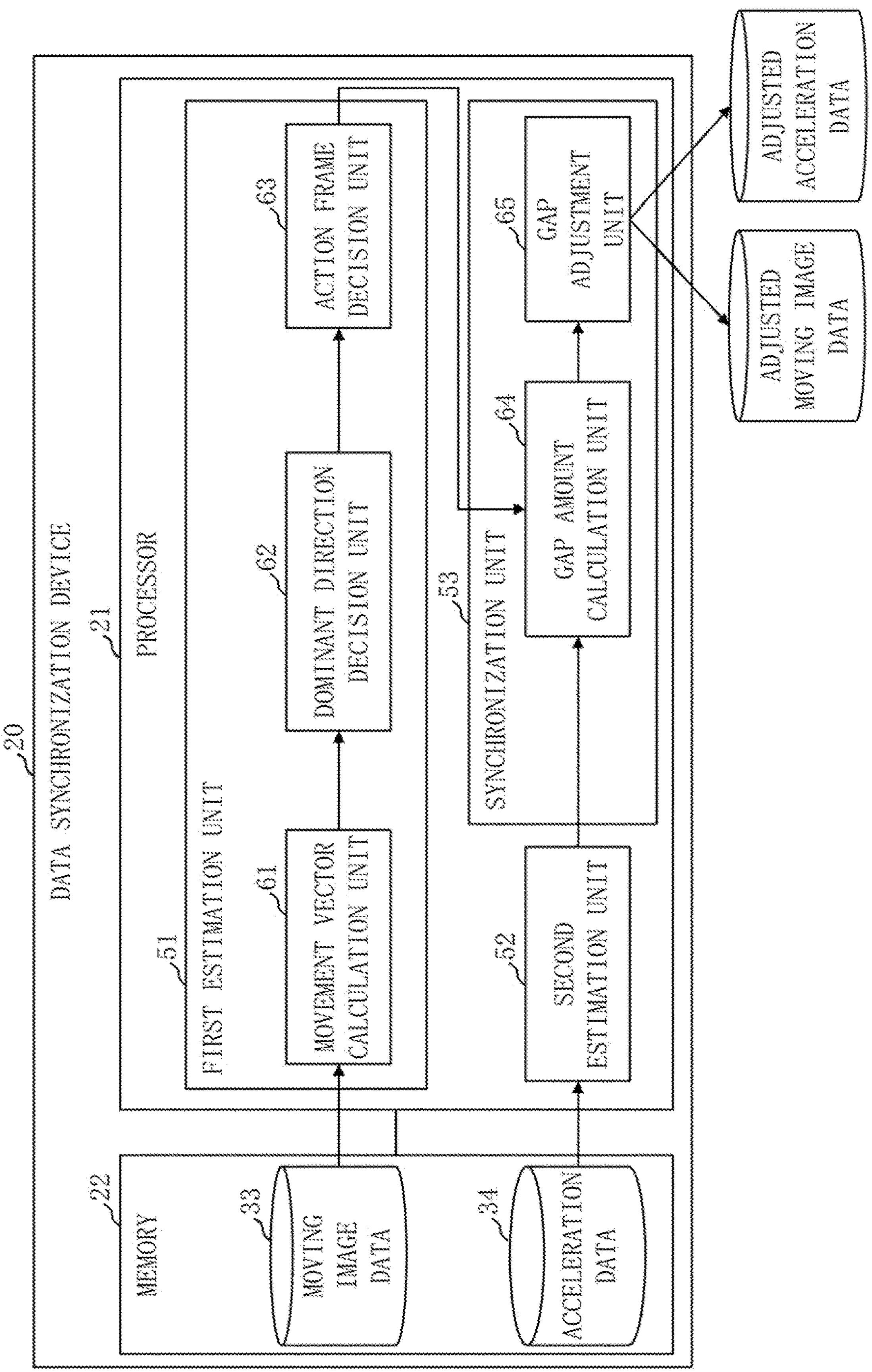
FIG. 2 is a block diagram illustrating a configuration of a data synchronization device according to the first embodiment.

A configuration of the data synchronization device 20 according to the present embodiment will be described with reference to FIG. 2.

The data synchronization device 20 is a computer. The data synchronization device 20 includes a processor 21 and also includes other pieces of hardware such as a memory 22. The processor 21 is connected to the other pieces of hardware via signal lines and controls the other pieces of hardware.

The data synchronization device 20 includes a first estimation unit 51, a second estimation unit 52, and a synchronization unit 53 as functional elements. The first estimation unit 51 includes a movement vector calculation unit 61, a dominant direction decision unit 62, and an action frame decision unit 63. The synchronization unit 53 includes a gap amount calculation unit 64 and a gap adjustment unit 65.

Functions of the first estimation unit 51, the second estimation unit 52, and the synchronization unit 53 are implemented by software. Specifically, the functions of the first estimation unit 51, the second estimation unit 52, and the synchronization unit 53 are implemented by a data synchronization program. The data synchronization program is a program that causes a computer to execute processes performed by the first estimation unit 51, the second estimation unit 52, and the synchronization unit 53, respectively as a first estimation process, a second estimation process, and a synchronization process. The data synchronization program may be provided after being recorded in a computer-readable medium, may be provided after being stored in a storage medium, or may be provided as a program product.

The processor 21 is a device that executes the data synchronization program. The processor 21 is, for example, a CPU. "CPU" is an abbreviation for Central Processing Unit.

The memory 22 is a device that stores the data synchronization program beforehand or temporarily. The memory 22 is, for example, a RAM, a flash memory, or a combination thereof "RAM" is an abbreviation for Random Access Memory.

In the memory 22, moving image data 33 and acceleration data 34 are stored. The moving image data 33 is time-series data of images obtained by shooting outside of the vehicle 30 by the camera 31 installed on the vehicle 30. The acceleration data 34 is time-series data of acceleration obtained by the acceleration sensor 32 installed on the vehicle 30. The moving image data 33 and the acceleration data 34 are respectively transmitted from the moving image recording-purpose system 41 and the acceleration recording-purpose system 42, and are received by a communication device which is not illustrated.

The communication device includes a receiver that receives data input to the data synchronization program and a transmitter that transmits data output from the data synchronization program. The communication device is, for example, a communication chip or a NIC. "NIC" is an abbreviation for Network Interface Card.

The data synchronization program is read from the memory 22 into the processor 21 and executed by the processor 21. In addition to the data synchronization program, the memory 22 also stores an OS. "OS" is an abbreviation for Operating System. The processor 21 executes the data synchronization program while executing the OS. Besides, a part of or all of the data synchronization program may be incorporated in the OS.

The data synchronization program and the OS may be stored in an auxiliary storage device. The auxiliary storage device is, for example, an HDD, a flash memory, or a combination thereof "HDD" is an abbreviation for Hard Disk Drive. If the data synchronization program and the OS are stored in the auxiliary storage device, the data synchronization program and the OS are loaded into the memory 22 and executed by the processor 21.

The data synchronization device 20 may include a plurality of processors substituted for the processor 21. The plurality of processors share execution of the data synchronization program. Each processor is, for example, a CPU.

Data, information, a signal value, and a variable value which are used, processed, or output by the data synchronization program are stored in the memory 22, the auxiliary storage device, or a register or a cache memory in the processor 21.

The moving image data 33 and the acceleration data 34 may be stored in the auxiliary storage device or may be stored in an external storage.

The data synchronization device 20 may be constituted of one computer or may be constituted of a plurality of computers. When the data synchronization device 20 is constituted of a plurality of computers, functions of the first estimation unit 51, the second estimation unit 52, and the synchronization unit 53 may be distributed to each computer to be implemented.

*Description of Operation*

Operation of the data synchronization device 20 according to the present embodiment will be described with reference to FIG. 3. The operation of the data synchronization device 20 corresponds to a data synchronization method according to the present embodiment.

In steps S1 to S3, the first estimation unit 51 extracts from the moving image data 33 obtained by shooting a scene in front of a traveling vehicle 30, a frame range in which the vehicle 30 is taking a right or left turn action, as behavior of the vehicle 30.

Specifically, in step S1, the movement vector calculation unit 61 of the first estimation unit 51 extracts characteristic points in each frame of the moving image and obtains optical flow as movement amounts of the characteristic points between the frames. That is, the movement vector calculation unit 61 calculates for each frame of the moving image data 33 input, in which directions the characteristic points on the frame move in subsequent frames. For each frame, the movement vector calculation unit 61 obtains vectors indicating the characteristic points and their directions.

In step S2, the dominant direction decision unit 62 of the first estimation unit 51 calculates a direction toward which the most movement vectors of the characteristic points are pointing in each frame, as a dominant direction of the movement amounts obtained in step S1. That is, the dominant direction decision unit 62 extracts from the vectors obtained by the movement vector calculation unit 61, the vector corresponding to the direction which exists the most in the frame as the dominant direction in each frame, and outputs the dominant direction.

In step S3, the action frame decision unit 63 of the first estimation unit 51 obtains as a first data range, a frame range in which the vehicle 30 is estimated to be turning right or left, based on the dominant direction in each frame. That is, the action frame decision unit 63 extracts based on the dominant direction in each frame obtained by the dominant direction decision unit 62, frames in which the vehicle 30 is estimated to be taking a right or left turn action, from moving image frames.

In step S4, the second estimation unit 52 extracts as a second data range, a data range in which the vehicle 30 is taking the right or left turn action, from the acceleration data 34 in a left or right direction of the vehicle 30. That is, the second estimation unit 52 extracts a range in which the vehicle 30 is estimated to be turning right or left, based on the acceleration data 34 which has been input.

In step S5, the gap amount calculation unit 64 of the synchronization unit 53 estimates a time gap amount between the moving image data 33 and the acceleration data 34 based on results obtained by the first estimation unit 51 and the second estimation unit 52. That is, the gap amount calculation unit 64 obtains the time gap amount between both pieces of data by matching both pieces of data based on the data ranges in which the vehicle 30 is turning right or left, the data ranges being in the moving image data 33 and the acceleration data 34 respectively obtained by the first estimation unit 51 and the second estimation unit 52. Since the right or left turn action can occur a plurality of times during one travel, the plurality of the matching processes and the plurality of the time gap amounts obtained by the matching processes are obtained.

In step S6, the gap adjustment unit 65 of the synchronization unit 53 synchronizes between the moving image data 33 and the acceleration data 34 using the gap amount estimated in step S5. That is, the gap adjustment unit 65 synchronizes the acceleration data 34 with the moving image data 33 based on the time gap amount obtained from the gap amount calculation unit 64.

As described above, the first estimation unit 51 estimates as the first data range, the data range in which the vehicle 30 is in a certain "motion", in the moving image data 33. Specifically, the first estimation unit 51 extracts characteristic points in each of frames of the images included in the moving image data 33, and obtains the first data range based on a bias in the movement directions of the extracted characteristic points between the frames.

The second estimation unit 52 estimates as the second data range, the data range in which the vehicle 30 is in the above-mentioned "motion", in the acceleration data 34. Specifically, the second estimation unit 52 obtains the second data range based on a change in acceleration indicated in the acceleration data 34.

The synchronization unit 53 performs a time-synchronization between the moving image data 33 and the acceleration data 34 based on the time range corresponding to the first data range estimated by the first estimation unit 51 and the time range corresponding to the second data range estimated by the second estimation unit 52. Specifically, the synchronization unit 53 calculates the gap amount between the time range corresponding to the first data range and the time range corresponding to the second data range, and performs the time-synchronization based on the calculated gap amount.

In the present embodiment, the above-mentioned "motion" is a right or left turn, but it may be either one of a right turn and a left turn, or a motion other than the right or left turn, such as traveling backward, a stop, or a U-turn.

Figure 4:
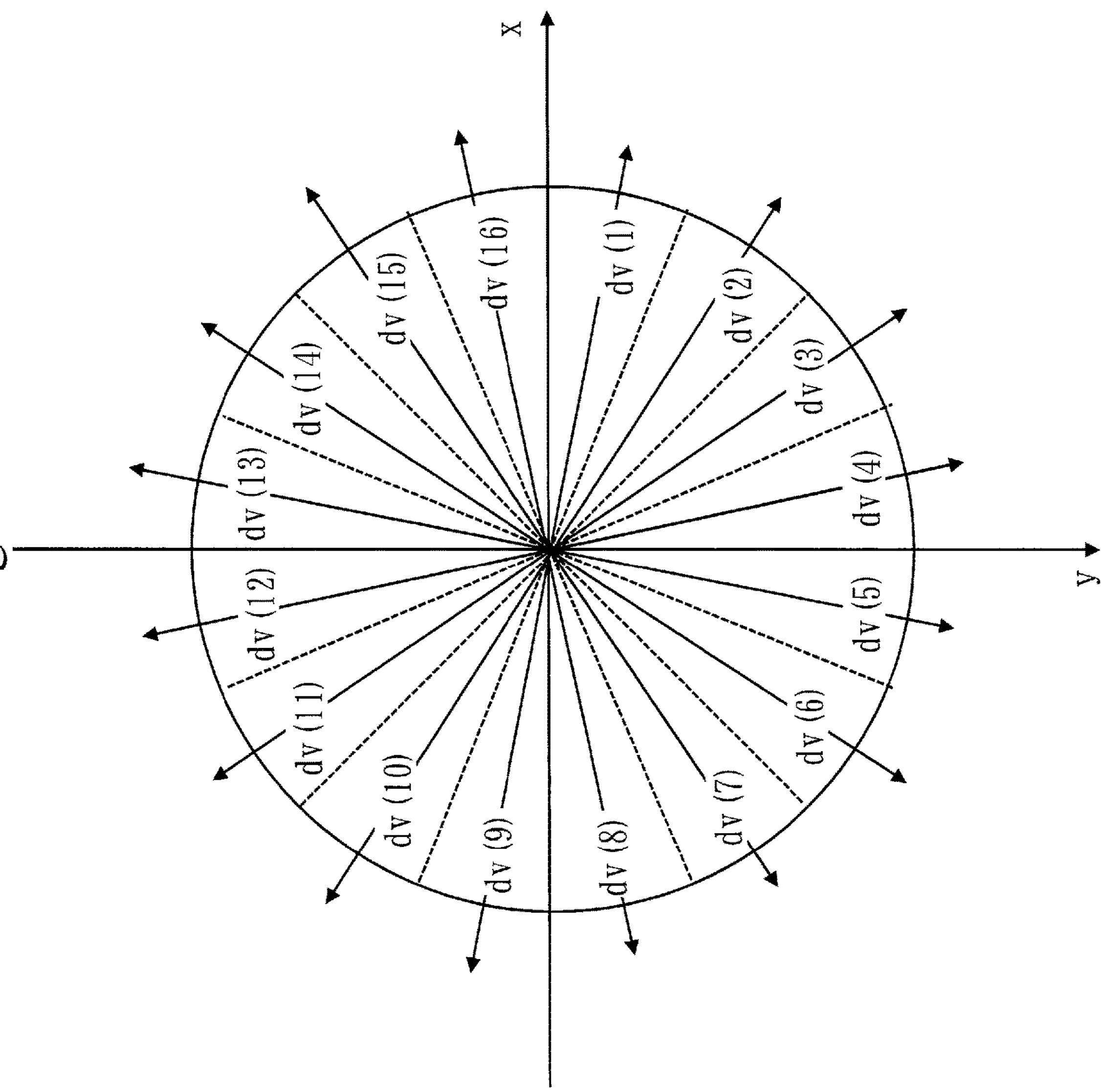
FIG. 4 is a diagram illustrating an example of classification of movement directions of characteristic points between frames according to the first embodiment.
Figure 5:
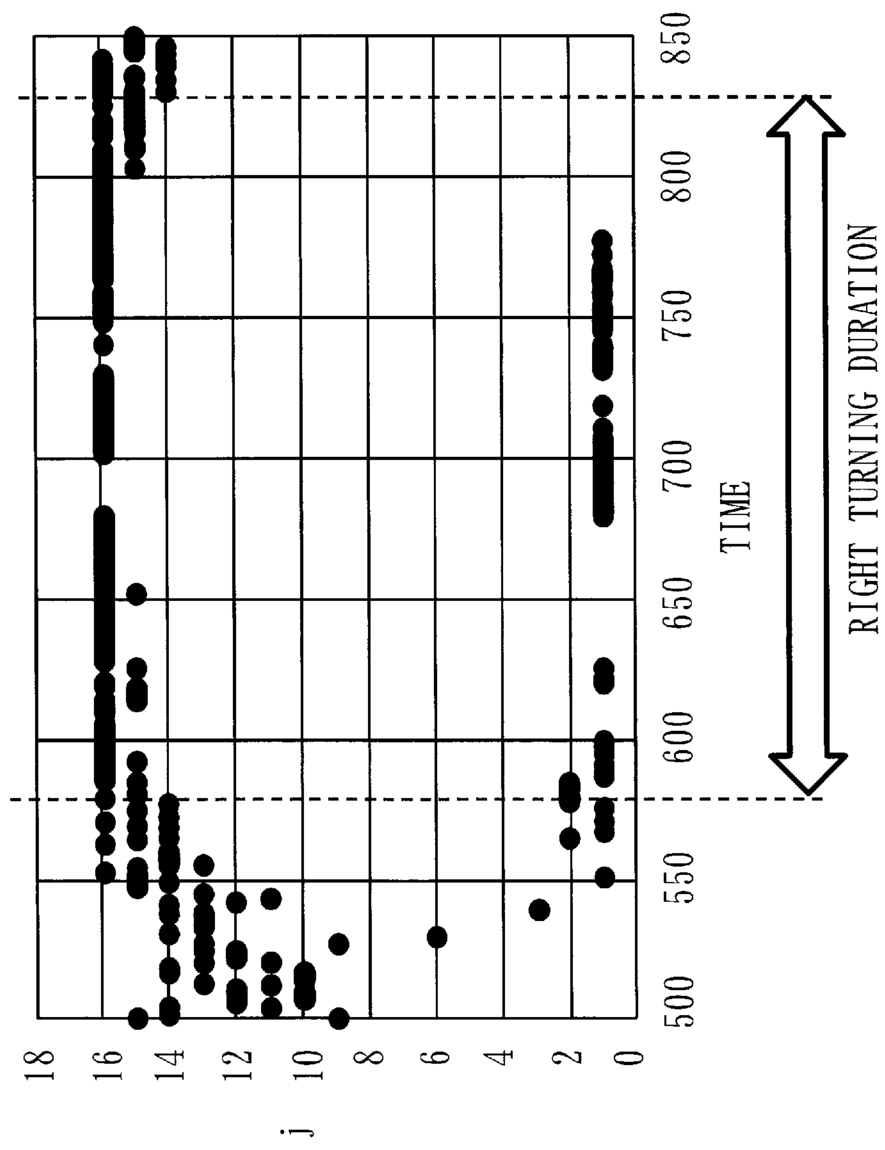
FIG. 5 is a diagram illustrating an example of changes in the movement directions of characteristic points between the frames according to the first embodiment.

In addition to FIG. 3, details of the operation of the data synchronization device 20 will be described with reference to FIG. 4 and FIG. 5.

In step S1, the movement vector calculation unit 61 scans each frame of the moving image data 33 and extracts characteristic points on the moving image frame. The movement vector calculation unit 61 calculates positions of the characteristic points in a next frame, and calculates vectors indicating the movement directions of the characteristic points based on each of the positions. A plurality of characteristic points are extracted in each frame, and the movement amount is calculated for each of the characteristic points. Although any method may be used for this process, in the present embodiment, an optical flow calculation method which is an existing technique is used. At a time of processing, the frame used for calculating the movement directions of the characteristic points may be a frame after a certain number of frames instead of a next frame of each frame.

In step S2, the dominant direction decision unit 62 extracts the vectors corresponding to the direction which exists the most in the frame from the vectors obtained by the movement vector calculation unit 61. In fact, there are slight gaps in the vectors, and vectors with a same direction are not always obtained. Therefore, in the present embodiment, as illustrated in FIG. 4, a plane of a two-dimensional frame of the moving image is divided into sixteen around a central axis, and an area in which a direction of each vector is included is obtained. A direction through a center line of an area including most vectors is set to be a dominant direction. That is, for a frame i, any one of sixteen vectors dv(j) illustrated by solid arrows in FIG. 4 is obtained as a dominant direction D(i). j is an integer from one to sixteen. Besides, a classification number of directions does not need to be sixteen as long as the number is a number that enables traveling straight action and the right or left turn action of the vehicle 30 to be distinguished from each other.

In step S3, the action frame decision unit 63 extracts based on D(i) obtained by the dominant direction decision unit 62, frames in which the vehicle 30 is estimated to be taking the right or left turn action, among the moving image frames. As illustrated in FIG. 5, at a time of a right or left turn, the movement directions of the characteristic points obtained from a moving image which is taken from the front of the vehicle 30, are biased leftward or rightward. That is, dv(1) or dv(16), or dv(8) or dv(9) continuously appears as D(i). By checking this continuity, it is possible to obtain a right or left turn frame range Flr(D(i))={{x1, x2}, {x3, x4}, . . . }. That is, from the x1 frame to the x2 frame, from the x3 frame to the x4 frame, . . . in the moving image are obtained as the range in which the vehicle 30 is turning right or left. When the moving image is shot from a position other than the front of the vehicle 30, the directions of the vectors are not necessarily left or right at a time of the right or left turn. However, there is no problem because the directions are convertible if a shooting direction of the camera 31 can be determined.

In a case where the characteristic points are on a moving body that is moving differently from the vehicle 30, even if the vehicle 30 is turning right or left, corresponding vectors are not necessarily obtained. However, unless there are many moving bodies around the vehicle 30, many characteristic points on a stationary body are to be obtained. As a result, since the movement directions of the characteristic points on the stationary body are calculated by the dominant direction decision unit 62, as the dominant direction, there is no influence on operation of the action frame decision unit 63.

In step S4, the second estimation unit 52 extracts a data range in which the vehicle 30 is estimated to be taking the right or left turn action, based on the acceleration data 34. The acceleration in the left and right direction of the vehicle 30 varies depending on a situation until just before a beginning of the right or left turn. However, when a driver tries to turn right or left, the driver always takes an action to steer a wheel to the right or the left. This action is an action to try to apply acceleration. That is, the acceleration changes between a moment just before the right or left turn and a moment of the right or left turn. Also, at a time of a right or left turn, after the vehicle 30 has turned, the acceleration is applied in a direction opposite to the direction in which the vehicle 30 has turned so as to return the direction of the vehicle 30. Therefore, acceleration in both the right direction and the left direction are applied. By utilizing this, it is possible to extract from the acceleration data 34, data Alr(Acc)={{y1, y2}, {y3, y4}, . . . }, which is in the range in which the vehicle 30 is turning right or left. That is, from the y1 sample to the y2 sample, from the y3 sample to the y4 sample, . . . from a beginning of the acceleration data 34 are obtained as the range in which the vehicle 30 is turning right or left.

In step S5, the gap amount calculation unit 64 matches the results obtained by the first estimation unit 51 and the second estimation unit 52 to obtain the gap between both results. That is, the gap amount calculation unit 64 superimposes the data range Alr(Acc) obtained by the second estimation unit 52 on the frame range Flr(D(i)) obtained by the first estimation unit 51, and then obtains the gap amount between both pieces of data.

Specifically, the gap amount calculation unit 64 obtains a right or left turn-data range {yi, yi+1} of Alr(Acc) which corresponds to a right or left turn-frame range {xi, xi+1} of Flr(D(i)). At this time, it is possible to select {yi, yi+1} which is a time closest to the time of {xi, xi+1}, assuming that the time gap between the acceleration data 34 and the moving image data 33 is not large. When a frame rate of the moving image data 33 is assumed to be f, the xi frame from the beginning=the xi/f second.

For obtained {yi, yi+1}, the gap amount calculation unit 64 calculates Δti1=(yi−xi/f) and Δti2=(yi+1−xi+1/f). This is because a time range given by {yi, yi+1} and a time range given by {xi, xi+1} are not necessarily the same. The gap amount calculation unit 64 obtains Δti1 and Δti2 which are respectively the gap amounts at the beginning and the end, and from this, calculates a gap amount Δti between {xi, xi+1} and {yi, yi+1}. In the present embodiment, it is assumed to be Δti=(Δti1+Δti2)/2.

In step S6, the gap adjustment unit 65 synchronizes the acceleration data 34 with the moving image data 33 based on the time gap amount obtained from the gap amount calculation unit 64. If it is xi<=x<=xi+1, based on the obtained gap amount Δti, a value of acceleration corresponding to a frame x is a value at a time of x/f+Δti. By utilizing this, the acceleration corresponding to the frame at a time of a right or left turn is calculated. If there is no corresponding data for a reason of a difference between a sampling rate of the acceleration and a frame rate of the moving image, it is possible to calculate the acceleration by interpolating with data before and after a corresponding time.

If it is xi+1<=x'<=xi+2 for right or left turn periods {xi, xi+1} and {xi+2, xi+3}, for a frame x' outside the right or left turn periods, in consideration of gap amounts in the preceding and following right or left turn periods, it is acceptable to set as a value of a corresponding acceleration, a value at a time of $x'/f+(\Delta ti+\Delta ti+2)/2$. For a frame before the first right or left turn period and a frame after the last right or left turn period, corresponding acceleration can be calculated by extrapolation.

The acceleration thus obtained becomes pieces of data corresponding to each frame of the moving image, and are synchronized with the moving image. That is, according to the present embodiment, even if a synchronization is not performed at a time of data acquisition, the synchronization can be performed by viewing only data.

Data that has been synchronized with either one of the moving image or the acceleration can also be synchronized via this system. For example, if there is data of a millimeter wave sensor taken by a same system or at a same time as a system that has acquired the acceleration data 34, the moving image and a detection result of the millimeter wave sensor can be synchronized according to the present embodiment.

*Description of Effect of Embodiment*

In the present embodiment, a time range corresponding to a data range in which the vehicle 30 is in a certain "motion", in the moving image data 33 obtained by the camera 31, and a time range corresponding to a data range in which the vehicle 30 is in the "motion", in the acceleration data 34 obtained by the acceleration sensor 32 are referred to. Therefore, according to the present embodiment, it is possible to perform a time-synchronization between different types of pieces of data which are the moving image data 33 and the acceleration data 34.

*Other Configurations*

In the present embodiment, functions of the first estimation unit 51, the second estimation unit 52, and the synchronization unit 53 are implemented by software. However, as a modification example, the functions of the first estimation unit 51, the second estimation unit 52, and the synchronization unit 53 may be implemented by hardware. For this modification example, differences from the present embodiment will be mainly described.

Figure 6:
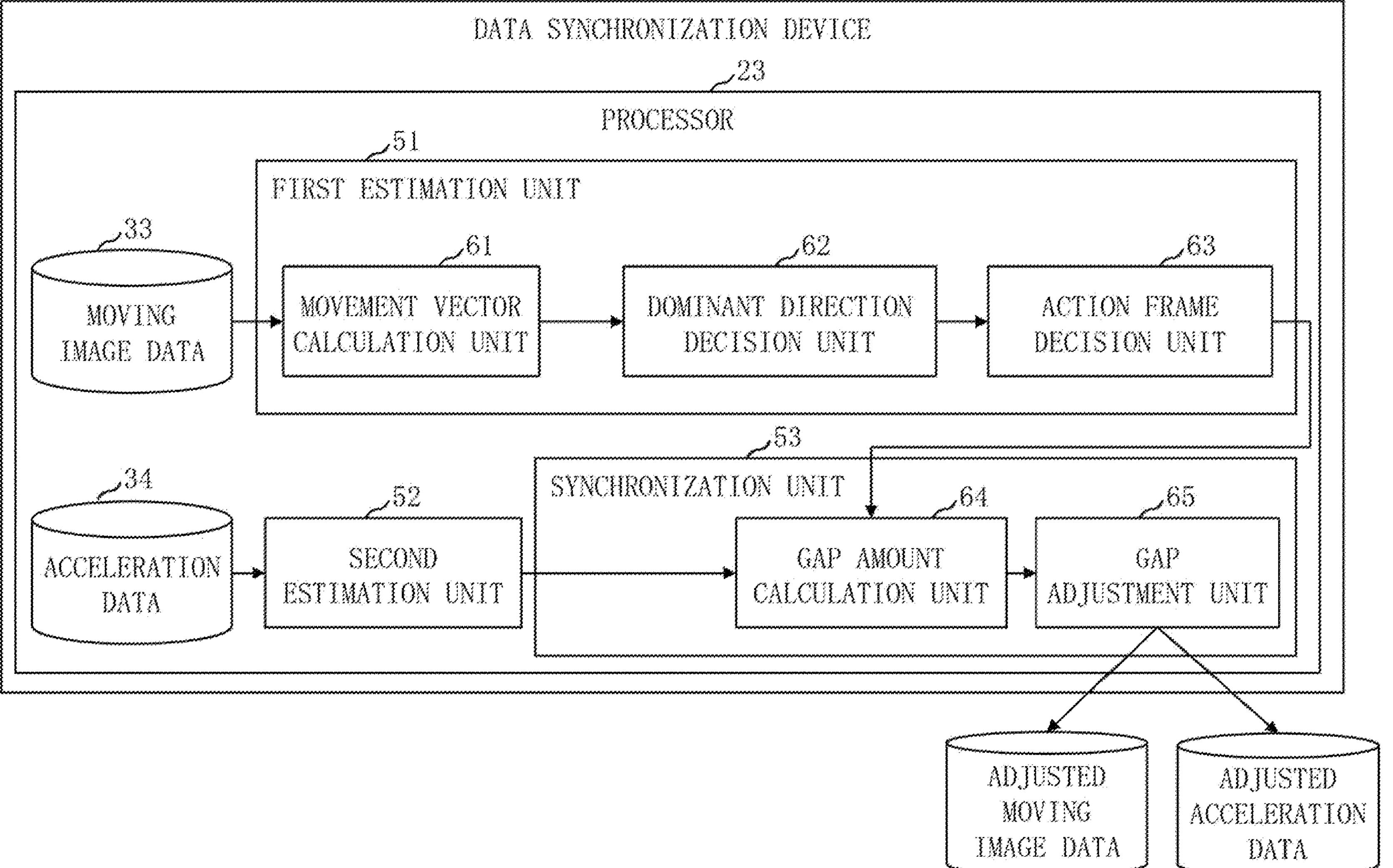
FIG. 6 is a block diagram illustrating a configuration of a data synchronization device according to a modification example of the first embodiment.

A configuration of the data synchronization device 20 according to modification examples of the present embodiment will be described with reference to FIG. 6.

The data synchronization device 20 includes hardware such as an electronic circuit 23.

The electronic circuit 23 is dedicated hardware that implements the functions of the first estimation unit 51, the second estimation unit 52, and the synchronization unit 53. The electronic circuit 23 is, for example, a single circuit, a composite circuit, a programmed processor, a parallel-programmed processor, a logic IC, a GA, an FPGA, an ASIC, or a combination of some or all thereof "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

The data synchronization device 20 may include a plurality of electronic circuits substituted for the electronic circuit 23. The plurality of electronic circuits implement the functions of the first estimation unit 51, the second estimation unit 52, and the synchronization unit 53 as a whole. Each of the electronic circuits is, for example, a single circuit, a composite circuit, a programmed processor, a parallel-programmed processor, a logic IC, a GA, an FPGA, an ASIC, or a combination of some or all thereof.

As another modification example, the functions of the first estimation unit 51, the second estimation unit 52, and the synchronization unit 53 may be implemented by a combination of software and hardware. That is, a part of the functions of the first estimation unit 51, the second estimation unit 52, and the synchronization unit 53 may be implemented by dedicated hardware, and a rest may be implemented by software.

Each of the processor 21 and the electronic circuit 23 is a processing circuit. That is, no matter whether the configuration of the data synchronization device 20 is the configuration illustrated in FIG. 2 or FIG. 6, operations of the first estimation unit 51, the second estimation unit 52, and the synchronization unit 53 are performed by the processing circuit.

Second Embodiment

For the present embodiment, differences from the first embodiment will be mainly described.

In the present embodiment, the first estimation unit 51 obtains the first data range by performing machine learning on the moving image data 33. The second estimation unit 52 obtains the second data range by performing machine learning on the acceleration data 34.

In the first embodiment, a state of the right or left turn of the vehicle 30 is determined by referring to a change itself in the value of the sensor, based on the moving image data 33 and the acceleration data 34. On the other hand, in the present embodiment, this is detected by machine learning. An existing technique other than machine learning may be used.

Third Embodiment

For the present embodiment, differences from the first embodiment will be mainly described with reference to FIG. 7.

Figure 7:
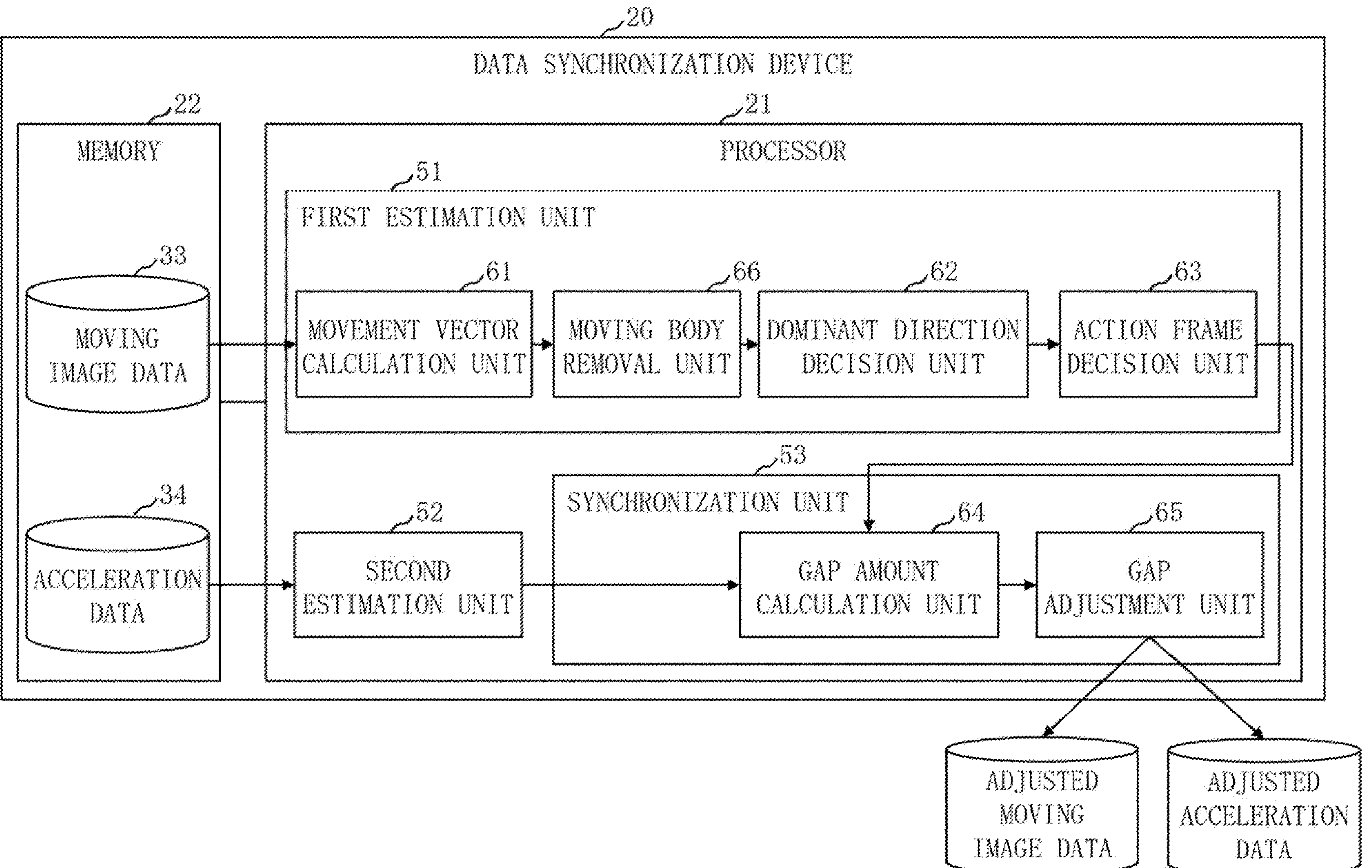
FIG. 7 is a block diagram illustrating a configuration of a data synchronization device according to a third embodiment.

In the present embodiment, as illustrated in FIG. 7, the first estimation unit 51 includes a moving body removal unit 66 in addition to the movement vector calculation unit 61, the dominant direction decision unit 62, and the action frame decision unit 63.

The moving body removal unit 66 removes characteristic points on a moving body shown in an image, among the characteristic points in each of the frames of the images included in the moving image data 33, extracted by the movement vector calculation unit 61. After the moving body removal unit 66 removes the characteristic points on the moving body, the dominant direction decision unit 62 calculates the movement direction of the characteristic points between frames, extracted by the movement vector calculation unit 61.

In the first embodiment, after the movement vectors of the characteristic points are calculated, the results are used directly in the dominant direction decision unit 62. On the other hand, in the present embodiment, the moving body in a frame is detected and removed in advance, by an image processing using preceding and following frames. Then, only the movement vectors of the characteristic points that are not on the moving body are extracted.

In the present embodiment, for the results from the movement vector calculation unit 61, the moving body removal unit 66 performs filtering so that only the movement vectors of the characteristic points on a stationary body can be obtained. As a result, only vectors that reflect the motion of the vehicle 30 can be extracted. That is, the dominant direction obtained by the dominant direction decision unit 62 and the motion of the vehicle 30 are more accurately associated with each other.

Fourth Embodiment

For the present embodiment, differences from the first embodiment will be mainly described.

In the present embodiment, the dominant direction decision unit 62 of the first estimation unit 51 filters the characteristic points according to the movement amounts of the characteristic points between frames, extracted by the movement vector calculation unit 61 of the first estimation unit 51, and then calculates the movement direction of the characteristic points between the frames.

In the first embodiment, no condition is provided for calculating the movement vectors of the characteristic points. On the other hand, in the present embodiment, only the vectors with lengths equal to or greater than a constant value a are selected. Since short vectors affect errors largely, the dominant direction can be calculated more accurately by excluding such vectors.

Fifth Embodiment

For the present embodiment, differences from the first embodiment will be mainly described.

In the present embodiment, the synchronization unit 53 analyzes a relationship between a movement amount of characteristic points between frames and a change amount of acceleration, the characteristic points being in each of the frames of the images included in the moving image data 33 in the first data range estimated by the first estimation unit 51, the acceleration being indicated in the acceleration data 34 in the second data range estimated by the second estimation unit 52. The synchronization unit 53 utilizes the analysis result for the time-synchronization.

In the first embodiment, only the times of the first frame and the last frame are used for matching {xi, xi+1} and {yi, yi+1}. On the other hand, in the present embodiment, the matching is performed based on a relationship between a change between lengths of the vectors of the first frame and the last frame and a change between the acceleration of the first frame and the last frame. This is because a change in a speed of the vehicle 30 caused by a change in acceleration is related to a length of a movement vector. The faster the speed is, the greater the change per unit time is and the longer the movement vector is.

Sixth Embodiment

For the present embodiment, differences from the first embodiment will be mainly described.

In the present embodiment, the first estimation unit 51 divides each of the frames of the images included in the moving image data 33 into a plurality of partial images, and obtains the first data range based on a bias in the movement directions per partial image.

In the first embodiment, the dominant direction of the movement vectors of the characteristic points is calculated based on the result from the whole frame. On the other hand, in the present embodiment, the moving image frame is divided into the plurality of partial images. Then, the dominant direction of the movement vectors of the characteristic points included in each partial image is calculated, and the result is utilized. Therefore, according to the present embodiment, behavior of the vehicle 30 which is not acquired from the whole frame can also be acquired. For example, at a time of traveling straight, the movement vectors converge on a direction of a vanishing point in an image, and thus such state can be obtained.

Thus, an action of the vehicle 30 other than a right or left turn, such as traveling straight can be calculated, and the action frame decision unit 63 obtains more frame ranges. Data of acceleration in a traveling direction of the vehicle 30 is added to the acceleration data 34 and is input to the second estimation unit 52 to obtain a data range at a time of traveling straight. Thereby, the gap amount calculation unit 64 can estimate a gap amount using more pieces of data, and as a result, it is possible to perform a more accurate synchronization.

REFERENCE SIGNS LIST

10: data synchronization system, 20: data synchronization device, 21: processor, 22: memory, 23: electronic circuit, 30: vehicle, 31: camera, 32: acceleration sensor, 33: moving image data, 34: acceleration data, 41: moving image recording-purpose system, 42: acceleration recording-purpose system, 51: first estimation unit, 52: second estimation unit, 53: synchronization unit, 61: movement vector calculation unit, 62: dominant direction decision unit, 63: action frame decision unit, 64: gap amount calculation unit, 65: gap adjustment unit, 66: moving body removal unit.

The invention claimed is:

1. A data synchronization device comprising:

processing circuitry to:

estimate as a first data range, a data range in which a vehicle is in a certain motion, in time-series data of images obtained by shooting outside of the vehicle with a camera installed on the vehicle, estimate as a second data range, a data range in which the vehicle is in the motion, in time-series data of acceleration obtained by an acceleration sensor installed on the vehicle, and perform a time-synchronization between the time-series data of the images and the time-series data of the acceleration based on a time range corresponding to the first data range estimated and a time range corresponding to the second data range estimated.

2. The data synchronization device according to claim 1, wherein the motion is at least any of a right turn and a left turn.

3. The data synchronization device according to claim 1, wherein the processing circuitry calculates a gap amount between the time range corresponding to the first data range and the time range corresponding to the second data range, and performs the time-synchronization based on the gap amount calculated.

4. The data synchronization device according to claim 1, wherein the processing circuitry extracts characteristic points in each of the frames of the images included in the time-series data of the images, and obtains the first data range based on a bias in movement directions of the extracted characteristic points between the frames.

5. The data synchronization device according to claim 4, wherein the processing circuitry calculates the movement directions after removing a characteristic point derived from a moving body shown in the image, among the characteristic points.

6. The data synchronization device according to claim 4, wherein the processing circuitry calculates the movement directions after filtering the characteristic points according to movement amounts of the characteristic points between the frames.

7. The data synchronization device according to claim 4, wherein the processing circuitry divides each of the frames of the images into a plurality of partial images, and obtains the first data range based on a bias in the movement directions on each of the partial images.

8. The data synchronization device according to claim 4, wherein the processing circuitry obtains the second data range based on a change in the acceleration indicated in the time-series data of the acceleration.

9. The data synchronization device according to claim 8, wherein the processing circuitry analyzes a relationship between the movement amounts of the characteristic points between the frames in the first data range and change amounts of the acceleration in the second data range, and utilizes an analysis result for the time-synchronization.

10. The data synchronization device according to claim 1, wherein the processing circuitry obtains the first data range by performing machine learning on the time-series data of the images.

11. The data synchronization device according to claim 1, wherein the processing circuitry obtains the second data range by performing machine learning on the time-series data of the acceleration.

12. A data synchronization method comprising:

estimating, by a first estimation unit, as a first data range, a data range in which a vehicle is in a certain motion, in time-series data of images obtained by shooting outside of the vehicle with a camera installed on the vehicle;

estimating, by a second estimation unit, as a second data range, a data range in which the vehicle is in the motion, in time-series data of acceleration obtained by an acceleration sensor installed on the vehicle; and performing, by a synchronization unit, a time-synchronization between the time-series data of the images and the time-series data of the acceleration based on a time range corresponding to the first data range estimated by the first estimation unit and a time range corresponding to the second data range estimated by the second estimation unit.

13. A non-transitory computer readable medium storing a data synchronization program which causes a computer to execute:

a first estimation process of estimating as a first data range, a data range in which a vehicle is in a certain motion, in time-series data of images obtained by shooting outside of the vehicle with a camera installed on the vehicle;

a second estimation process of estimating as a second data range, a data range in which the vehicle is in the motion, in time-series data of acceleration obtained by an acceleration sensor installed on the vehicle; and a synchronization process of performing a time-synchronization between the time-series data of the images and the time-series data of the acceleration based on a time range corresponding to the first data range estimated by the first estimation process and a time range corresponding to the second data range estimated by the second estimation process.

* * * * *